US012056017B2

(12) United States Patent
Mehta et al.

(10) Patent No.: US 12,056,017 B2
(45) Date of Patent: Aug. 6, 2024

(54) CAPACITY-BASED REDIRECTION EFFICIENCY AND RESILIENCY

(71) Applicant: Dell Products L.P., Round Rock, TX (US)

(72) Inventors: Viral Mehta, Pune (IN); Madhura Srinivasa Raghavan, Milpitas, CA (US); Bhagyashri Pathak, Pune (IN); Donna Barry Lewis, Holly Springs, NC (US); Andrew R Huber, Chapel Hill, NC (US); Sirisha Kaipa, Cupertino, CA (US)

(73) Assignee: Dell Products L.P., Hopkinton, MA (US)

( * ) Notice: Subject to any disclaimer, the term of this patent is extended or adjusted under 35 U.S.C. 154(b) by 176 days.

(21) Appl. No.: 17/725,087

(22) Filed: Apr. 20, 2022

(65) Prior Publication Data
US 2023/0342260 A1    Oct. 26, 2023

(51) Int. Cl.
G06F 16/00         (2019.01)
G06F 11/14         (2006.01)
G06F 16/2455       (2019.01)

(52) U.S. Cl.
CPC .... *G06F 11/1464* (2013.01); *G06F 16/24552* (2019.01); *G06F 2201/84* (2013.01)

(58) Field of Classification Search
CPC .......... G06F 11/1464; G06F 16/24552; G06F 2201/84; G06F 16/183
See application file for complete search history.

(56) References Cited

U.S. PATENT DOCUMENTS

| | | | |
|---|---|---|---|
| 2017/0091235 A1* | 3/2017 | Yammine | G06F 16/164 |
| 2017/0124345 A1* | 5/2017 | Christiansen | G06F 16/1727 |
| 2023/0020458 A1* | 1/2023 | Chaudhary | G06F 11/1464 |
| 2023/0022351 A1* | 1/2023 | Kaipa | G06F 16/1824 |

* cited by examiner

Primary Examiner — Alexander Khong
(74) Attorney, Agent, or Firm — Staniford Tomita LLP

(57) ABSTRACT

A database manager maintains a database including information tracking a set of storage units and a set of storage appliances on which the storage units currently reside. At least a portion of the tracking information is cached in a server cache at a namespace redirection server. Some of the tracking information is cached in a set of client caches at a set of clients. A request to access a storage unit is received at a client. A lookup is made into a client cache at the client to find a storage appliance having the storage unit. A determination is made that there is a problem accessing the storage unit using the client cache. So, the namespace redirection server is queried for updated tracking information concerning a location of the storage unit. The client assists the namespace redirection server with management of the server cache.

15 Claims, 13 Drawing Sheets

Determine that a client referral cache at a client does not have an entry in the location tracking information identifying a data protection storage appliance on which a storage unit should currently reside
510

Query a namespace redirection server for location information of the storage unit
515

Include, in the query to the namespace redirection server, an indication as to whether the location information for the storage unit is to be cached in the client referral cache
520

Receive, by the namespace redirection server, the query and return the location information for the storage unit to the client
525

Track, at the namespace redirection server, a percentage of clients intending to cache the location information
530

Based on the percentage of clients intending to cache the location information, adjust a caching strategy for a server referral cache at the namespace redirection server
535

FIG. 5

Track, by a client library, failed attempts to connect to a storage appliance on which a storage unit should reside according to storage unit location information cached in a client referral cache
710

Based on the failed attempts, query a namespace redirection server for the storage unit location information and include a request for a force lookup
715

Upon receiving, at the namespace redirection server, the request for the force lookup, clear a server referral cache at the namespace redirection server and query a database for up-to-date storage unit location information
720

Return to the client updated location information for the data protection storage appliance on which the storage unit should currently reside
725

FIG. 7

CAPACITY-BASED REDIRECTION EFFICIENCY AND RESILIENCY

TECHNICAL FIELD

The present invention relates generally to information processing systems, and more particularly to backup systems.

BACKGROUND

File system referrals provide a method of extending a file system to multiple servers, transparent to the application. Referrals provide a technique to point to file systems located on other servers while maintaining a single namespace. Referrals can be used in a storage system environment to increase the capacity of the storage system, by distributing storage directories across multiple storage appliances. When the application wishes to access or backup data, the application can be redirected to the proper storage appliance where the data should reside using a referral.

The referral process includes a series of operations involving location lookups, multiple redirection hops, dependencies on a referring server, and other operations in order to reach the proper storage appliance. These operations can introduce delays and latencies in responding to requests from the application. Current referral techniques lack robust error handling which can further impact performance of the application. There is a need for improved systems and techniques of handling referrals.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 5 shows a flow for adjusting a caching strategy of a server referral cache, according to one or more embodiments.

FIG. 7 shows a flow for a force lookup, according to one or more embodiments.

DETAILED DESCRIPTION

Figure 1:
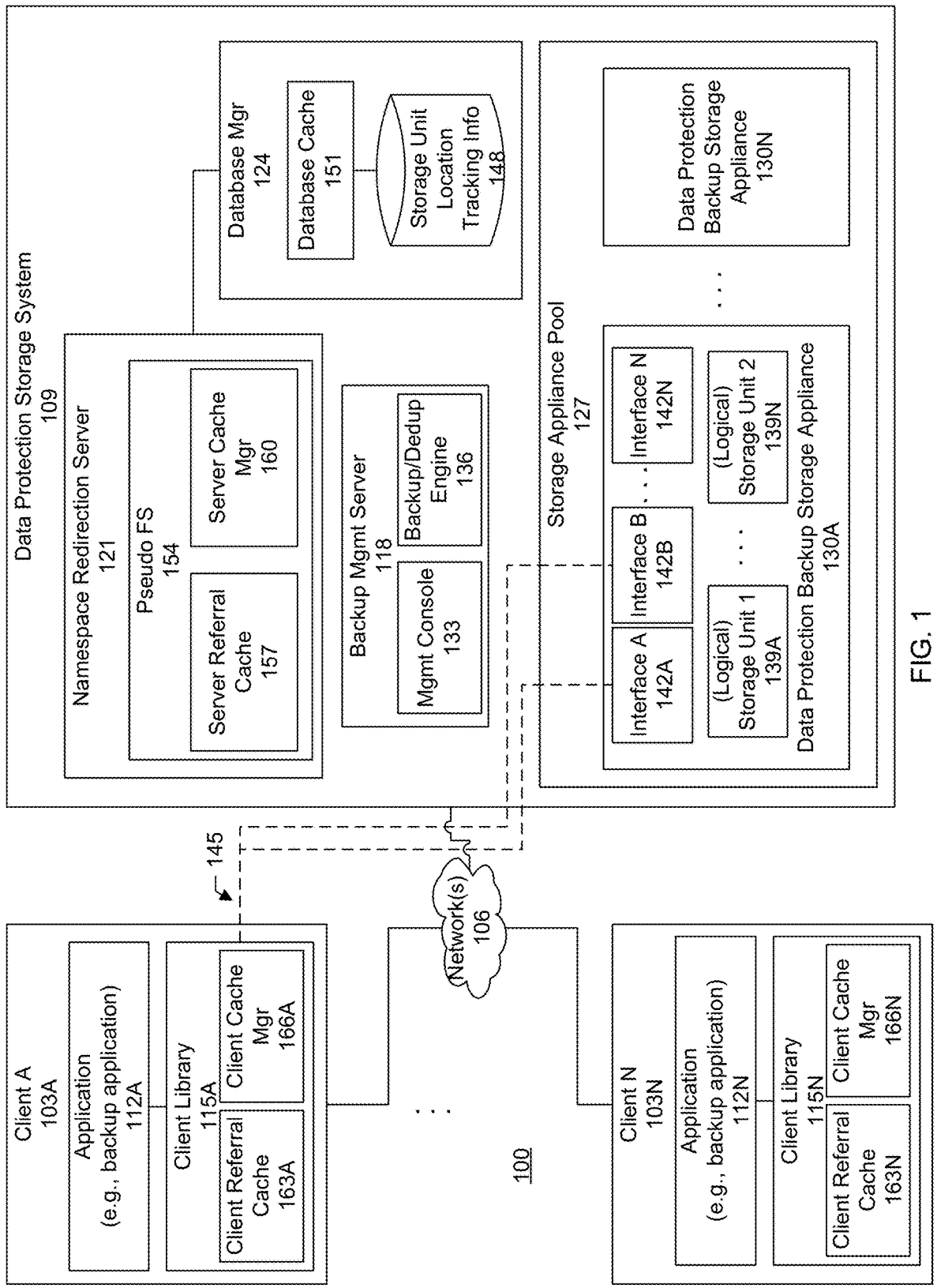
FIG. 1 shows a block diagram of an information processing system for referral caching, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a block diagram of an information processing system 100 within which methods and systems for improving or optimizing capacity-based redirection efficiency and resiliency may be implemented. In the example shown in FIG. 1, there are a set of clients 103A-N connected via one or more networks 106 to a data protection backup storage system 109. The clients include applications 112A-N and client-side libraries 115A-N. In an embodiment, a client application includes a backup application that backs up client data to the data protection storage system. The data protection system includes a backup management server 118, namespace redirection server 121, database manager 124, and a storage pool 127 having multiple (e.g., two or more) data protection backup storage appliances 130A-N. An example of a storage appliance is a Data Domain™ Restorer (DDR) storage system as provided by Dell Technologies of Round Rock, Texas.

The clients may include servers, desktop computers, laptops, tablets, smartphones, internet of things (IoT) devices, virtual machines (VMs), containers, client processes, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated or sourced by system 100 may be stored in any number of persistent storage locations and devices, such as within storage devices of the appliance pool, which may at least be partially implemented through storage device arrays, such as RAID components. In an embodiment, the network may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays. In an embodiment, the target storage devices, such as a disk array may represent any practical storage device or set of devices, such as fiber-channel (FC) storage area network devices, and OST (OpenStorage) devices. The data source storage may be provided through a virtual machine or physical storage devices, and the target storage devices may represent disk-based targets implemented through virtual machine technology.

The backup management server 118 includes a management console 133 and backup/deduplication engine 136. In an embodiment, a backup application or backup process on a client interfaces with a client library to coordinate with the backup/deduplication engine and conduct data protection operations, e.g., backups of client data to the data protection storage system. The backup management server 118 is responsible for the overall management and configuration of the data protection operations. The backup management server 118 works with the client backup applications to conduct data protection jobs. For example, the backup management server 118 may maintain a schedule indicating when backups are to be performed. When a time for backup has arrived, the backup management server 118 may issue a command to a client to begin a backup job.

The management console 133 provides an interface to the management server 118 and is a user interface for managing system configuration and monitoring the health of the system. For example, a user can use the management console 133 to author data protection or backup policies, create backup schedules, associate clients to the backup policies, add storage appliances to the storage pool, create storage units on the storage appliances, view and browse different backup sets, and perform other administrative and management tasks.

In an embodiment, the client backup applications 112A-N, via the client libraries 115A-N, communicate with the backup/deduplication engine to perform deduplicated backups. For example, a data protection operation may be initiated with the client backup application initiating communication with the client library. The client library, in turn, communicates with the backup/deduplication engine of the backup server to backup client files, in a deduplicated manner, to the data protection storage system. In particular, the files are divided into segments or pieces and a hash function is applied to the segments in order to generate fingerprints identifying the segments. The fingerprints are compared to fingerprints of segments already stored on the data protection storage system. Non-matching fingerprints indicate that corresponding segments are new and should be written or stored to the data protection storage system. Matching fingerprints indicate that corresponding segments are already stored or redundant and do not have to again be stored. Instead, metadata references may be generated to point to the already stored segments. The metadata allows the files to be reconstructed when there is a need to restore the data.

In an embodiment, the client library provides for a deduplicated backup protocol that may be referred to as Data Domain Boost (DDBoost) as provided by Dell Technologies. As such, the clients may be referred to as DDBoost clients. In this embodiment, the clients may use the DDBoost backup protocol to conduct deduplicated backups of client data to the appliance pool, restore the backups from the appliance pool to the clients, or perform other data protection operations. The DDBoost library exposes application programming interfaces (APIs) to integrate with a Data Domain Restorer system using an optimized transport mechanism. These API interfaces exported by the DDBoost library provide mechanisms to access or manipulate the functionality of a Data Domain file system. In general, DDBoost is a system that distributes parts of the deduplication process to the backup server or application clients, enabling client-side deduplication for faster, more efficient backup and recovery.

Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. Some specific embodiments are described in conjunction with storage systems, products, and services referred to as Data Domain as provided by Dell Technologies. It should be appreciated, however, that the described systems and techniques can be applied to other similar storage systems, products, and services. For example, some specific embodiments are described in conjunction with the DDBoost protocol. Aspects and principles of embodiments described, however, are applicable to other protocols such as Network File System (NFS), Common Internet File System (CIFS), and others.

In an embodiment, during a data protection operation, an application on a client calls the client-side library application programming interfaces (APIs) which, in turn, issue remote procedure calls (RPC) to a server or other component of the data protection storage system (e.g., storage appliance). RPC is a distributed computing technique in which a computer program calls a procedure (subroutine or service) to execute in a different address space than its own. In the RPC protocol, the client makes a request to execute a procedure on the remote server. Like a synchronous local call, the client is suspended until the procedure results are returned back. The procedure's parameters are passed over the network to the server-side. The procedure executes on the server and the results are returned back to the client. Client-side library code cooperates with server-side code to perform the requested operation such as a distributed deduplication and backup of user data to reduce the data that is actually sent to the server and to reduce the physical storage required to store the data.

The appliance pool can be a grouping of multiple storage appliances on which any number of storage units 139A-N reside. A storage appliance may be referred to as a node or storage node. A storage unit (SU) is a logical container to group data including any number of files, directories, volumes, or objects that are to be protected by the data protection backup system. A storage unit may be referred to as a mobile storage unit as a storage unit may be moved to different storage appliances. In an embodiment, a storage unit corresponds to a directory within a file system of a storage appliance. A storage unit may be associated with attributes including a user authorized to access the storage unit, name or other identifier for the storage unit, optional storage quotas or limits specifying an amount of data that may be written to the storage unit, other attributes, or combinations of these. In an embodiment, there is at most a single user authorized to access or write to a storage unit. This helps to facilitate good security and ensure that backups are not accidentally overwritten. In other embodiments, there can be multiple users authorized to write to a storage unit. In an embodiment, there is a backup set. The backup set is a group of one or more files stored in a storage unit that are the contents of an application's file(s) at some point in time (the time the backup was taken). A storage unit thus may contain more than one backup set. And in some scenarios a backup set may be larger than a storage unit, so that a single backup set may be stored on multiple storage units.

Each storage appliance includes multiple access points, ports, links, or interfaces 142A-N that a client may connect to in order to conduct a data protection job, e.g., backing up or restoring a backup set. The storage pool may include any number of storage appliances on different networks and reachable through multiple Internet Protocol (IP) addresses or network paths 145. The interfaces of a storage appliance may be referred to as locations. Having multiple locations at which a storage appliance can be accessed facilitates resiliency and load balancing. In other words, connections to a particular storage appliance may be spread across the multiple locations of the storage appliance. If a connection to a storage appliance cannot be made using a particular location of the storage appliance, an attempt to connect using a different location of the storage appliance may be made. The storage pool, including the data protection storage appliances and (logical) storage units which reside on the appliances, provides customer users with a flexible and efficient way to manage, configure, and administer their storage and data protection needs.

For example, the system can be scaled out or in by adding or removing appliances from the storage appliance pool. In the scale-out systems, storage units are hosted on any of the target storage appliances or nodes and these storage units are also migratable and can move from one target node to another as part of rebalancing work. Clients (e.g., DDBoost clients) are redirected to the node where storage units are hosted for backup and restore purposes. In an embodiment, redirection is facilitated via a redirection server or node running a redirection service. Redirection services can determine storage unit location from some other persistent storage such as a database which will have the current storage unit location information.

The redirection technique, however, carries limitations that can impact performance. Specifically, reading storage unit location information from the database each time is costly; querying storage unit location information from a redirection service has an additional hop each time there is a request to find a storage unit location; and since the storage unit can migrate, it is also important to get to the right node each time. In other words, redirection in such an environment is dependent on access to a primary server to track and provide server location information, and for the client library to then redirect connections.

To reduce or minimize the impact of the location lookup, extra redirection hop, RPC messages sent to the primary server, and dependency on the primary server to reach the proper storage system, and provide a resilient mechanism, systems and techniques provide for a cooperative multi-layer-cache technique. A cache is a hardware or software component that temporarily stores at least a portion of data locally or separately from main memory or other storage location. Requests for that data can be served faster from the cache as compared to retrieving the data from main storage or other remote storage location that may require traversing a network. For example, when a process attempts to access data, the process may initially check a cache local to the process. A cache hit occurs when the requested data can be found in a cache. A cache miss occurs when the requested data cannot be found in the cache. When there is a cache miss, the data may be pulled from main memory or other storage location and copied into the cache. Cache hits are served by reading data from the cache, which is faster than recomputing a result or reading from a slower data store; thus, the more requests that can be served from the cache, the faster the system performs.

In an embodiment, the database manager 124 manages storage unit location tracking information 148 and database referral cache 151. There is a database storing information tracking locations of the storage units and, in particular, the data protection storage appliances or storage nodes on which the storage units currently reside. The stored information maps storage units to a pool of data protection storage appliances on which the storage units currently reside. The information includes IP addresses through which each appliance can be reached. In an embodiment, the database is a postgres database. The database cache caches at least a portion of the storage unit location tracking information. The database manager is responsible for managing the database cache and communications involving the database cache including communications with the namespace redirection server.

Table A below shows an example of storage unit location tracking information:

TABLE A

| SU_1 | 192.168.10.21 |
|------|---------------|
|      | 192.168.10.22 |
|      | 192.168.10.23 |
| SU_2 | 192.178.10.21 |
|      | 192.178.10.22 |
|      | 192.178.10.23 |

A first column of the table lists the storage units. A second column of the table lists multiple IP addresses through which a storage appliance currently having the corresponding storage units may be reached. The table can be accessed by storage unit name (the key) in order to find the IP address(es) (the value(s)).

The namespace redirection server 121 hosts a redirection service and includes a pseudo file system 154 having a server referral cache 157 and server cache manager 160. The pseudo file system may be referred to as a Global Scale File System (GSFS). Global Scale is a data management platform for multiple Power Protect appliances as provided by Dell Technologies. In an embodiment, the Global Scale platform includes a pseudo file system that implements location information lookup operations for backup set objects. It should be appreciated, however, that the systems and techniques described herein may be known by any name or identifier. Aspects and principles of the Global Scale platform may be provided in any environment or platform having multiple storage appliances to manage.

The server referral cache, like the database cache, also caches at least a portion of the storage unit location tracking information. The server cache manager 160 is responsible for managing the server referral cache and communications involving the server referral cache including communications with the database manager and communications with the clients.

The client libraries 115A-N include client referral caches 163A-N and client cache managers 166A-N, respectively. The client referral cache, like the database and server caches, also caches at least a portion of the storage unit location tracking information. The client cache manager is responsible for managing the client referral cache and communications involving the client referral cache including communications with the namespace redirection server 121. The cached information allows the client application to make connections to the storage appliances without having to necessarily query the namespace redirection server. As discussed above, however, storage unit location tracking information cached at the client may become stale as storage units migrate or move to different storage appliances. Systems and techniques are provided to reduce the likelihood of failed attempts to reach a storage appliance, reduce latency, and network congestion, and improve resiliency.

In an embodiment, there is a method to improve or optimize referral lookups and client redirections using cooperative client and server side referral caches. In another embodiment, there is a method for the client, server, and database caches to operate in sync and decide what to cache at each layer using multiple methods. In another embodiment, there is a method to invalidate and force deep lookup on the server side by the client based on error scenarios. In another embodiment, there is a method to propagate statistics such as network/path failures back to server side caching to rectify lookup response to other clients. In other words, unlike other protocols having referrals such as NFSv4, systems and techniques provide for a client to initiate server side cache refresh/lookups based on error conditions; and client and server side caches to work cooperatively rather than independently to improve optimization and increase resiliency.

Figure 2:
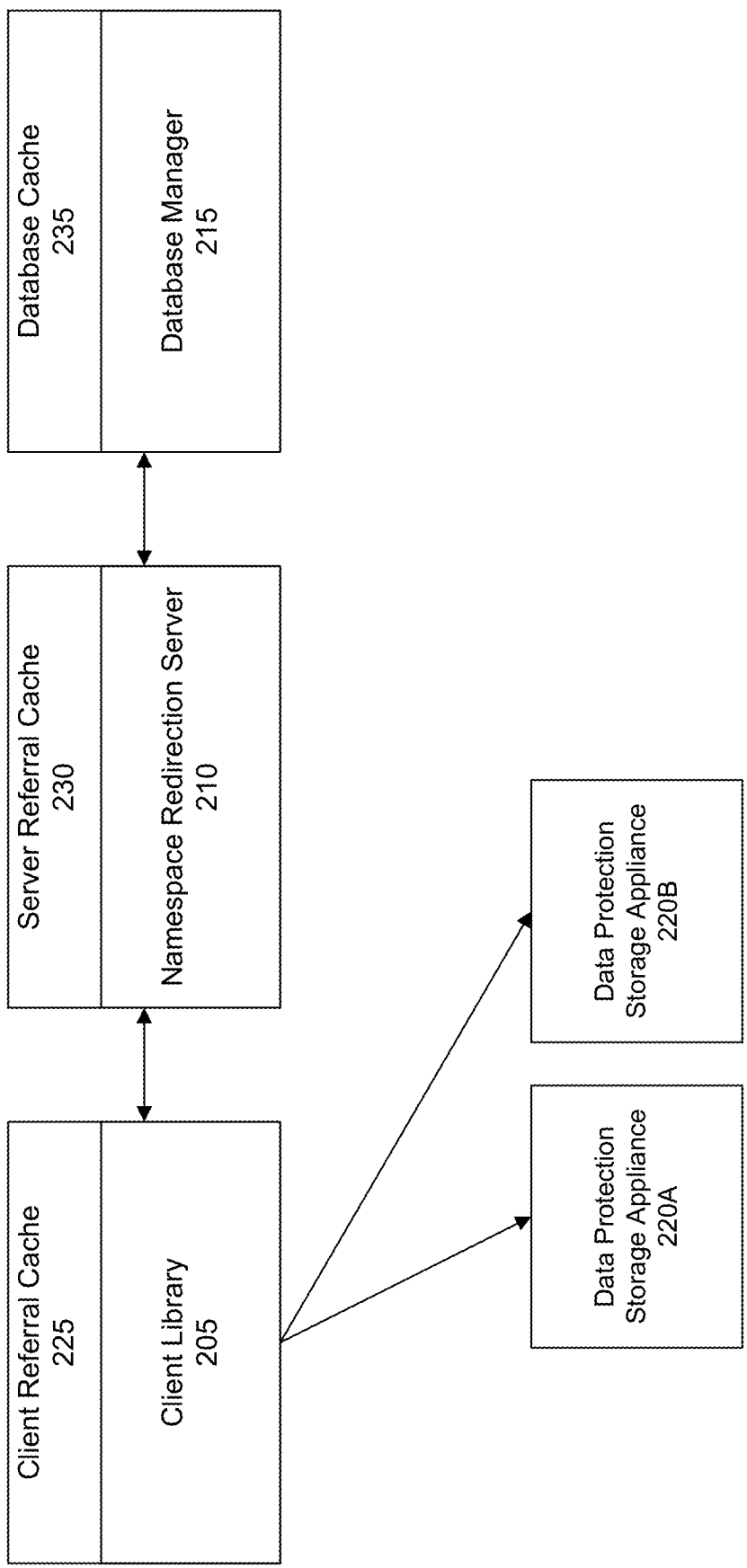
FIG. 2 shows a block diagram of different caches involved with the referral caching, according to one or more embodiments.

FIG. 2 shows a block diagram of some of the components or modules from FIG. 1 involved with referral caching to improve redirection efficiency and resiliency in a scale-out data protection storage system. In an embodiment, the storage system deploys a method of using referrals to extend the capacity available to a client to multiple appliances using referrals. The following is a discussion of the referral caching technique according to one or more embodiments.

As shown in the example of FIG. 2, the data protection storage system includes a client library 205, namespace redirection server 210, database manager 215, and multiple data protection storage appliances or nodes, e.g., 220A,B. The client library includes a client referral cache 225. The namespace redirection server includes a server referral cache 230. The database manager includes a database cache 235.

In the environment shown in the example of FIG. 2, a namespace redirection service hosted by the namespace redirection server is responsible for redirecting the client library to a particular data protection storage appliance where a storage unit is present and the redirection is accomplished using referral information of the storage unit. Different components running on different systems can build their own caches to optimize the performance of referral lookups. This application describes the different caches and the techniques they use to work cooperatively to increase or optimize performance, maintain cache coherency, and also provide resiliency.

In an embodiment, the client library is integrated with backup applications or agent processes. The referral cache of the client library helps to avoid trips for referral lookup information over the network every time the client application or process seeks to establish a connection to a storage unit. The client referral cache may or may not be periodically refreshed. Periodic cache refreshes help to increase the probability of a cache hit, but can also contribute to network congestion. In an embodiment, whether or not periodic cache refreshes are enabled and the frequency with which the caches are refreshed are user-configurable values. This allows each customer to tune the system according to their particular environment, available compute resources, and needs.

The server referral cache on the namespace redirection server helps to avoid database lookups when many hundreds of clients are looking for storage unit location information. In an embodiment, the namespace redirection server performs periodic refreshes of its server referral cache. For example, the cache may be refreshed every 10 minutes, 15 minutes, or any other frequency as desired. Nonetheless, there can be instances where configurations (e.g., storage unit locations) may have changed in between refreshes, thereby resulting in stale information in the server cache.

The database cache helps to avoid frequent disk operations and reading from the database. The caches including the client caches, namespace redirection server cache, and database management cache facilitate scaling of the data protection storage system to support many hundreds and thousands of clients. The database may be limited with respect to the number of connections it can support. For example, the database may be limited to serving 128 parallel or concurrent queries. The multiple caches, however, can be used to support many more parallel queries by avoiding or limiting the number of connections made to the database.

Figure 3:
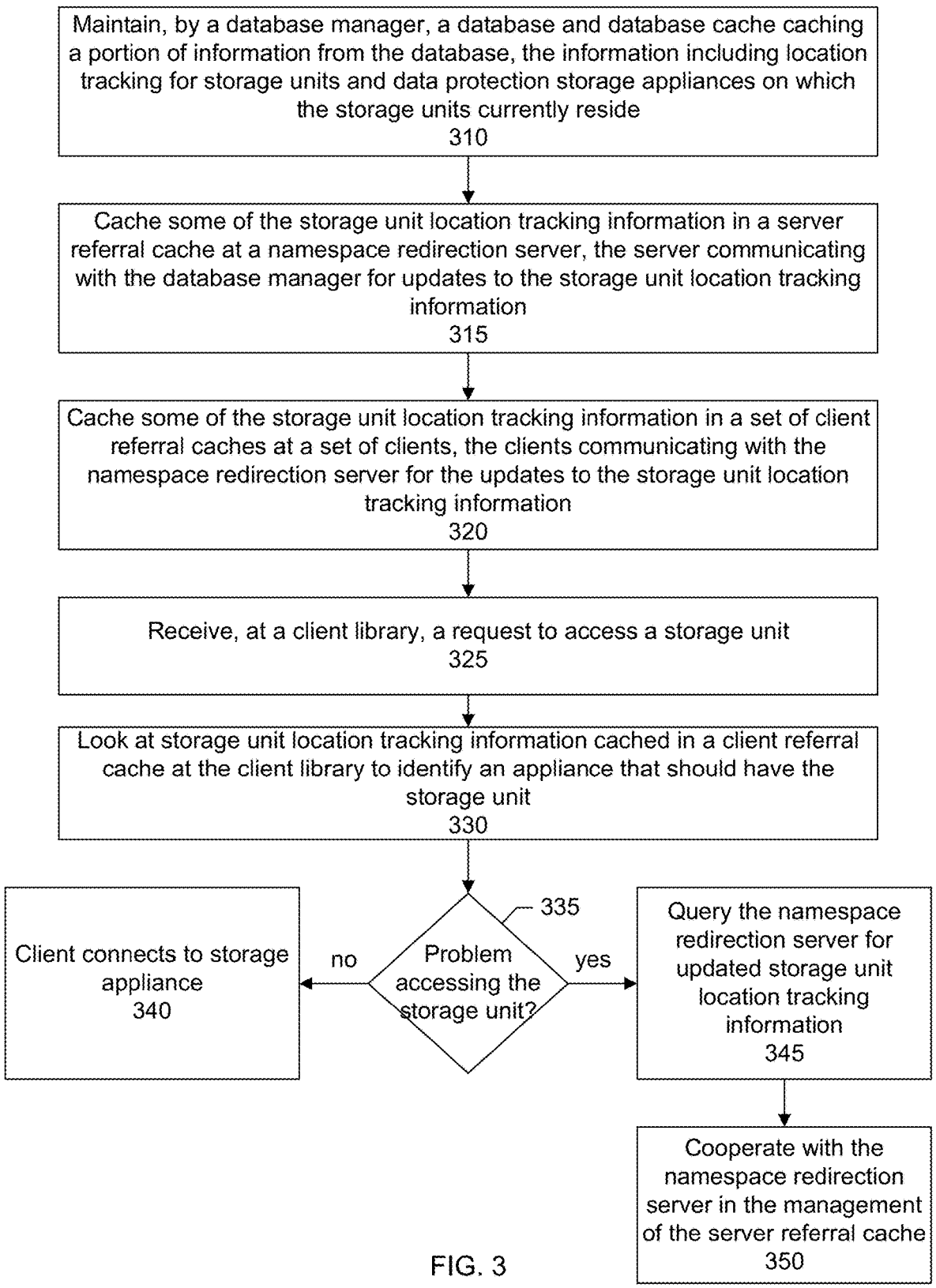
FIG. 3 shows an overall flow for the referral caching, according to one or more embodiments.

FIG. 3 shows an overall flow for referral caching and redirection. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a database manager maintains a database and a database cache. The database cache caches at least a portion of information from the database. The information includes storage unit location tracking information and, more particularly, information identifying data protection storage appliances on which the storage units currently reside.

In a step 315, some of the storage unit location tracking information is also cached in a server referral cache at a namespace redirection server. The namespace redirection server communicates with the database manager to obtain updates to the storage unit location tracking information.

In a step 320, some of the storage unit location tracking information is also cached in a set of client referral caches residing at a set of clients or client libraries. The client libraries communicate with the namespace redirection server for the updates to the storage unit location tracking information. Some or even all of what is cached in the server referral and client caches is the same as what is cached by the database cache. The server referral cache could be smaller, larger, or the same size as the database cache. Similarly, the client cache could be smaller, larger, or the same size as the database cache. As a result, the contents of any of the caches could be a subset of, a superset of, the same as, or completely disjoint from the contents of any other cache.

In a step 325, a request is received at a client or, more specifically, client library to access a storage unit. The request may be issued by a client backup application or backup process to an API exposed by the client library.

In a step 330, the client library searches or performs a lookup of a client referral cache, at or local to the client library, to identify a storage appliance that should have the storage unit.

In a step 335, a determination is made as to whether there is a problem accessing the storage unit using the information cached in the client referral cache. If there is not a problem, the client application connects to the storage appliance (step 340).

Alternatively, if the determination is that there is a problem accessing the storage unit using the information cached in the client referral cache, the client library issues a query to the namespace redirection server for updated tracking information concerning a location of the storage unit (step 345). The problem may be because of a cache miss where the client referral cache does not have a cache entry for the storage unit identifying a storage appliance that should have the storage unit.

Another example of a problem accessing the storage unit includes the client referral cache having a cache entry for the storage unit, but the storage unit nonetheless remaining inaccessible. For example, the client library may attempt to connect to a storage appliance specified in the cache entry as having the storage unit, but may receive an error message. The error message may indicate that no such storage appliance exists, that the storage unit does not currently reside at the storage appliance, or that a connection request to the storage appliance timed out. A timeout refers to a time period within which a connection between the client and the storage appliance must be established. If the client does not receive a response message from the storage appliance within the time period, a timeout occurs.

For example, the storage appliance may be offline. As another example, the storage unit may have been migrated to a different storage appliance and the client referral cache may not yet have been updated with the current location of the storage unit. In an embodiment, the client library makes multiple attempts to access the storage unit using the information stored in the client referral cache. As discussed, a storage appliance may have multiple network interfaces or IP addresses through which the storage appliance can be reached. The client library, prior to querying the namespace redirection server, may repeatedly iterate through the multiple IP addresses or alternative IP addresses in an attempt to make a successful connection to the storage appliance. A determination that there is a problem may be made when, for example, each attempt to connect to the storage appliance to access the storage unit resulted in a failure or timeout.

In cases such as the above, the client library queries the namespace redirection server for updated storage unit location tracking information.

In a step 350, the client library cooperates with the namespace redirection server with management of the server referral cache. The cooperation may include assisting the namespace redirection server with cache management by providing details associated with the client library's attempt to establish a connection to the storage appliance in addition to the query for the updated storage unit location tracking information.

For example, in a case where the client library has made multiple attempts to establish a connection to the storage appliance using the information in the client referral cache, the client library may initiate and transmit an RPC message or query to the namespace redirection server. The RPC may include any number of parameters, associated values, or other information detailing the attempts. In particular, the client library may set a flag in the RPC message indicating that the namespace redirection server should perform a force lookup for the updated storage unit location tracking information. The receipt of the RPC with the flag set indicates to the namespace redirection server that the information in its server referral cache may be stale and that the server referral cache should thus be cleared and refreshed by connecting to the database manager.

As another example, in a case where the client library has determined that the client referral cache simply does not have an entry for the storage unit, the client library may initiate and transmit an RPC message to the namespace redirection server and not set the flag in the RPC message indicating that the namespace redirection server should perform a force lookup. The receipt of the RPC with the flag not set indicates to the namespace redirection server that the requested storage unit location information may be retrieved by looking at existing entries previously cached in the server referral cache and without having to clear the server referral cache and connect to the database manager.

As another example, the client library may set a flag in the query to the namespace redirection server indicating that the client library intends (or does not intend) to cache the updated storage unit location information that is to be returned to the client. This allows the namespace redirection server to maintain a count of the number of clients intending to cache or not cache the storage unit location information. The namespace redirection server can then adjust its caching strategy based on the count.

For example, if a large number of clients indicate that they intend to cache the information, the namespace redirection server may delete the entry from its server referral cache in order to increase the cache space for other data. Alternatively, if only a small number of clients indicate that they intend to cache the information, the namespace redirection server may retain the entry in its server referral cache as there may be a high likelihood of being contacted by a client for the updated storage unit location information. Sending notice that a client intends to cache the information also allows the server to keep track of who has the information, and therefore to send an "invalidate" message to the client if the information becomes invalid such as if the server moves a storage unit. This can help overall performance since it means the client would then avoid unnecessary invalid requests to the storage unit's old location on future connection attempts to the storage unit. Further discussion is provided below.

Figure 4:
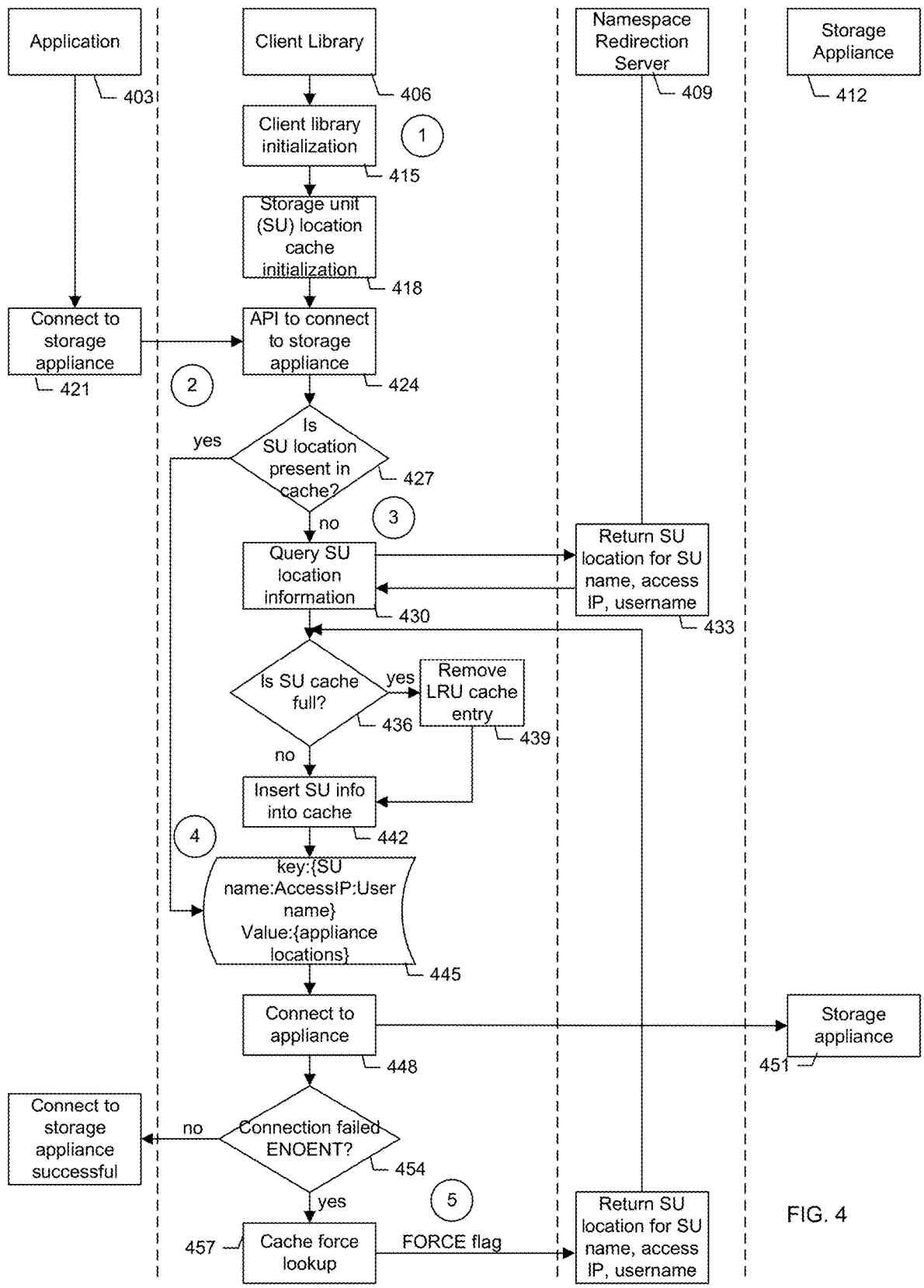
FIG. 4 shows a detailed flow for a client referral cache, according to one or more embodiments.

FIG. 4 shows a more detailed swimlane diagram for client-side caching and associated client referral cache operations. The swimlane diagram includes a client application or process (e.g., backup application) 403, client library 406, namespace redirection server 409, and data protection storage appliance 412 on which storage units reside.

In an embodiment, there is static sized cache on the client library side and storage unit referral information is saved in the cache.

In a first step, the client library is initialized during load time (415). The storage unit cache is also initialized during that time (418). As discussed, in an embodiment, the client cache is a static fixed-size array for the cache entry. In another embodiment, the cache includes a dynamically sized hash array to hold the SU cache entries.

In a second step, the client application or process makes an API call to the client library to connect to a data protection storage appliance hosting a mobile storage unit (421, 424).

In a third step, the client library first looks at all the current cache entries to determine whether it has a corresponding storage unit entry present in the cache or not (427). In an embodiment, a key for the lookup is formed combining a name of the storage unit (StorageUnitName), an IP address (AccessIP), and a username associated with the storage unit (username).

If the entry is not present in the client cache, the client library connects to the namespace redirection service and queries the storage unit location information from the namespace redirection service (430). Once the namespace redirection service returns that information, the client library populates its own cache entry with the returned information and then attempts to connect to a storage appliance on which the storage unit should reside.

A determination is made as to whether the client's SU cache is full (436). If the cache is full, a least recently used (LRU) replacement algorithm removes the least recently used entry from the cache (439). Storage unit location information is inserted into an empty space in the cache (442).

The client library can also show its intent to cache this entry at the time of the lookup request. That is, when the client library makes an initial request to the redirection server for the storage unit location information, the client library can set a flag in the request to indicate to the redirection server that the client library intends to cache the returned information. This allows the server to maintain a count of a number of clients that have cached a particular SU location entry to decide its own cache strategy.

The cache lookup further ensures that an unauthorized user cannot use the cache entry since the previously authorized username is embedded into the key. Cache lookups are also based on access IPs which helps to ensure that the locations are only used if the access was intended via the same cached subnet otherwise a new lookup will be performed via the namespace redirection service. This provides correctness for different users and a multipath environment. More particularly, in an embodiment, there is an initial filtering where, based on the "Access IP" passed by the client library, the namespace redirection server returns a list of IP addresses which are relevant for a specific network partition. For example, if a client is configured to have access to a "172.16.10.XXX" network only, it will pass the "access IP" of the same subnet and the namespace redirection server returns a list of IP addresses in the same subnet which are configured on a storage appliance where the storage unit should be present. This type of client access may be configured when the storage unit is created.

In a fourth step, if the entry is present in the cache, the client library finds out the storage appliance location from the values (445) and attempts to connect to the storage appliance (448, 451).

The client library uses various algorithms to select the IP address/hostname to connect to the storage appliance from the number of locations available in a cache entry. As discussed, a storage appliance includes multiple locations (e.g., network interfaces, paths, or IP addresses) through which a connection may be established. In an embodiment, the client library selects according to a load balancing algorithm, an IP address from the list to attempt an initial connection to the particular data protection storage appliance. In an embodiment, the load balancing algorithm relies on random selection to distribute load evenly across the multiple network interfaces of the storage appliance. In other words, the selection of the IP address relies on random or round-robin selection.

If the client library cannot connect using the first location information that is found from the storage unit location tracking information, the client library can try some or all of the alternate locations until a connection timeout occurs. In an embodiment, the namespace redirection service can send up to 16 locations in a "locations" array. Techniques for storage appliance path selection are further described in U.S. patent application Ser. No. 17/377,038, filed Jul. 15, 2021, and is incorporated by reference along with all other references cited.

The namespace redirection service knows or tracks the response and addresses that are sent to the various clients or client libraries. The client also in the response propagates information as to whether the information is cached or not. The client can indicate its intent to cache in the initial request, e.g., at the time of the lookup. In another embodiment, the client can indicate its intent to cache in another RPC to the server. This information exchange via the same RPC can also be used to give hints to each layer whether it is expected to cache entries or optimize on caching based on various algorithms. This provides resiliency for network or path failures such as IP unreachable.

In an embodiment, the client also maintains the error rate on the referral IP so it can use this information for subsequent lookups. In an embodiment, the client periodically checks on this redirection IP, to clear the errors automatically if it was a transient network issue causing the connectivity issues, and to refresh the referral information from the namespace redirection server when it appears that the redirection IP does not seem to be reachable for an extended period of time. This can be based on configuration parameters to determine how and when the client can refresh the redirection IPs for a storage unit in this case.

In an embodiment, the client also propagates network path failures along with other statistics back to the GSFS or namespace redirection server cache using RPC which the server can accommodate in its response to other clients by dropping the same if there are multiple paths available. This is an example of how a multi-layer cache can cooperatively work to reduce or optimize redirection latency.

The client library makes a determination as to whether a connection attempt failed (454). In a fifth step, if a storage appliance returns an error such as storage unit is not present on the appliance, the client library invalidates its own cache entry and requests a force lookup from the namespace redirection service (457). The namespace redirection service on receiving the request with the force lookup also clears its own cache and queries for storage unit location information from persistent storage such as the database which will always have the up-to-date storage unit location information. These techniques may be referred to as cooperative caching. This technique of requesting the forced lookup avoids having the namespace redirection service return stale information to any other clients requesting the same redirection.

The following are some scenarios when cache refresh is triggered: 1) when a client encounters an error with connecting to a redirection IP for a storage unit or when it is unable to connect to any of the redirection IPs for a storage unit; 2) when a client finds the storage unit is not present on the DDR where it was redirected; or 3) when a client-side cache refresh is manually triggered by an administrator.

Table B below shows an example of a data structure that may be used for maintaining storage unit location cache on a client-side library. The data structure is provided merely as an example of a specific implementation. In this specific embodiment, the data structure is incorporated into a data protection system referred to as Power Protect Smart Scale as provided by Dell. As one of ordinary skill in the art would understand, principles and operations of the data structure cache can be applied to other data protection systems.

TABLE B

```
Cache
/*
 * Setting size of location information cache as 32.
 * This value is decided based on historical asup data and su
access pattern of apps
 * like avamar, vproxy, PPDM etc.
 * TODO: It can be fine tuned based on cache hit/miss stats and
can be made dynamic.
 * For more info: https://jira.cec.lab.emc.com/browse/DDOS-
100648
 * so max cache size is
DDP_LOCATION_CACHE_MAX*DDP_CACHE_LOCATION_MAXKEYLEN = 16K
 */
#define DDP_LOCATION_CACHE_MAX                    32
The API ddcl_location_lookup returns "loc_info" which will
contain multiple redirection IPs for the storage unit.
Storage Unit Cache
/*
 * Location cache
 * init done               - indicates if cache is initialized
 * location_cache_mutex    - mutex to protect location cache
 *     - should be held while inserting, invalidating and
searching cache entries
 * num_entries             - number of cache entries that are
currently marked "valid"
 *     this is 0 to DDP_LOCATION_CACHE_MAX
 * entry_to_free           - entry to free when cache is full
 * entries                 - location cache entries
 * location_stats          - location cache statistics
 */
typedef struct ddp_location_cache {
    dd_bool_t                    init_done;
    dd_mutex_t                   location_cache_mutex;
    int                          num_entries;
    int                          entry_to_free;
```

TABLE B-continued

```
    ddp_location_cache_entry_t         * entries;
    ddp_location_stat_t                location_stats;
} ddp_location_cache_t;
/*
 * Location cache entry
 * valid              - indicates if location entry is valid
 * key                - key used to cache
 * cache_hit          - cache hit per Storage unit
 * loc_val            - location info cached
 */
typedef struct ddp_location_cache_entry {
    dd_bool_t                          valid;
    char *                             key;
    dd_uint64_t                        cache_hit;
    ddcl_location_info_t               loc_val;
} ddp_location_cache_entry_t;
/*
 * location_count              - number of locations in an array of
locations
 * locations - array of locations, path information of DDR for a
particular Storage Unit
 */
typedef struct ddcl_location_info {
        ddcl_lookup_flags_t flags;
        dd_uint32_t locations_count;
        ddcl_location_t *locations;
} ddcl_location_info_t;
Generate Key - Cache Entry key is generated based on Storage
Unit Name, Access IP/Hostname, DDBoost user name
Key
_generate_key(char *su_name, const char *hostname, const char
*username, char *key)
```

FIG. 5 shows a flow for cooperation between the client library and namespace redirection service that allows the namespace redirection service to adjust its caching strategy and thus improve overall performance of the service in responding to client requests.

In a step 510, a determination is made that a client referral cache at a client does not have an entry identifying a data protection storage appliance on which a storage unit should currently reside. The determination may be a result of performing a lookup into the client cache using an identifier of the storage unit and receiving a cache miss. Alternatively, the determination may be from receiving a cache hit, but then receiving an error when attempting to connect to the appliance supposedly having the storage unit according to the client cache. For example, the storage unit may have been moved to a different storage appliance and the storage unit location information in the client cache may have yet to be updated.

In a step 515, query is issued to a namespace redirection server for location information of the storage unit.

In a step 520, the client includes, in the query to the namespace redirection server, an indication as to whether the location information for the storage unit is to be cached in the client referral cache. That is, in an embodiment, the client includes as part of its request (515) to the namespace redirection server a notification as to whether the location information for the storage unit is to be cached in the client referral cache. Informing the server about the intent by the client to cache the location information may be accomplished by setting a flag in the query to the server.

In a step 525, the namespace redirection server receives the query including the indication as to whether the client intends to cache the location information. The server retrieves the location information about the storage unit and returns the information to the client.

In a step 530, the namespace redirection server tracks a percentage or number of clients that have indicated an intent to cache the location information for the storage unit.

In a step 535, the namespace redirection server, based on the percentage or number of clients caching the location information for the storage unit, adjusts a caching strategy for a server cache at the namespace redirection server.

Figure 6:
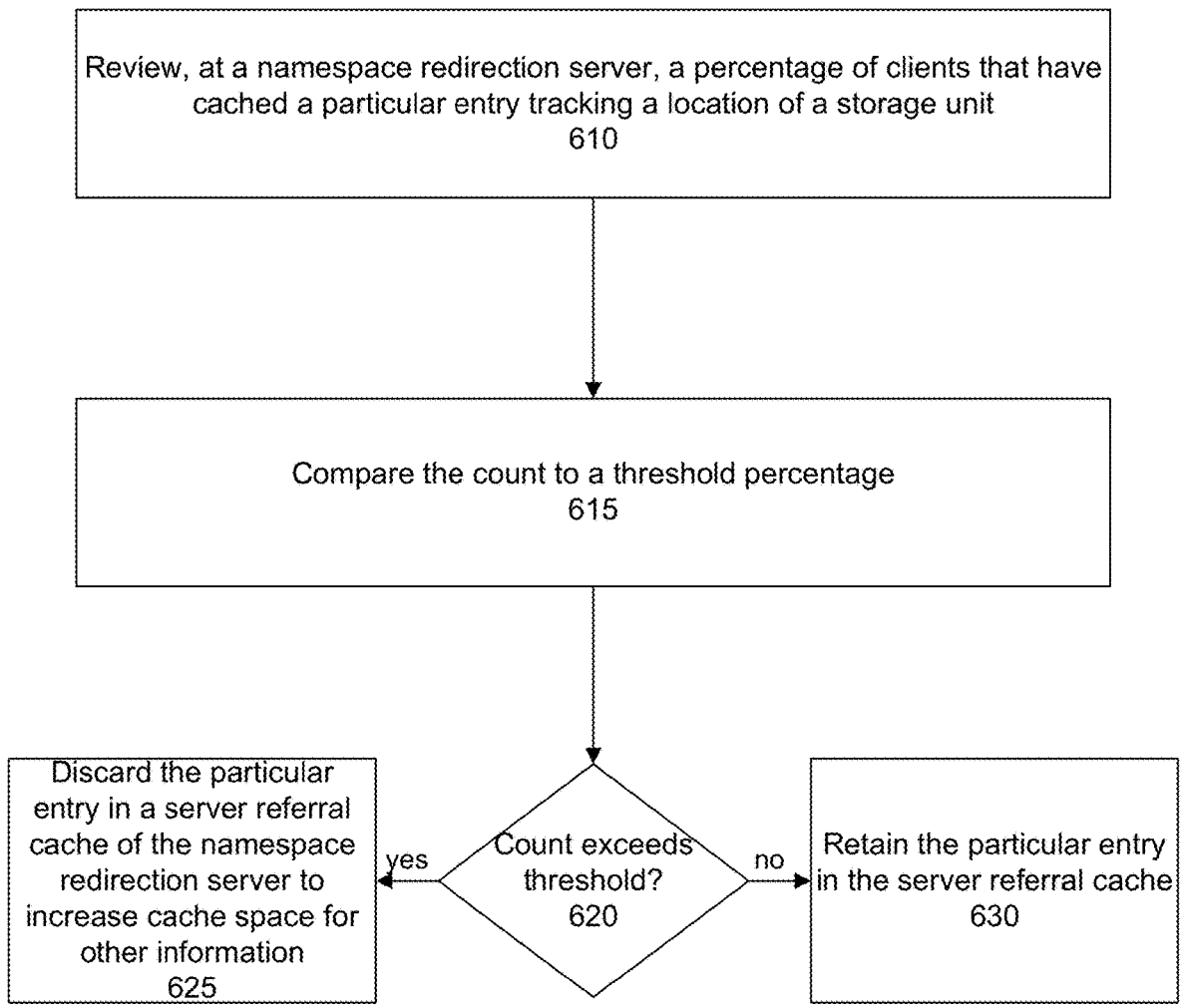
FIG. 6 shows a flow for determining when to discard or retain an entry in a server referral cache, according to one or more embodiments.

FIG. 6 shows an example of a flow for adjusting a caching strategy of the server referral cache. In a step 610, the namespace redirection server reviews a percentage of a number of clients that have indicated an intent to cache the location information for a storage unit.

In a step 615, the namespace redirection server compares the percentage to a threshold percentage. In a step 620, a determination is made as to whether the percentage is above the threshold percentage. If the percentage exceeds the threshold, the namespace redirection server discards or deletes from its server referral cache an entry for the location information of the storage unit (step 625). Alternatively, if the percentage does not exceed or is below the threshold, the entry for the location information of the storage unit is retained in the server referral cache (step 630).

For example, the namespace redirection server may track, over a rolling time period, the percentage of clients that have indicated an intent to cache location information for a particular storage unit. Once the rolling time period has elapsed, the namespace redirection server may compare the percentage to a threshold percentage. If the percentage is below the threshold percentage, the namespace redirection server may maintain in its server cache an entry including the location information for the particular storage unit. If the percentage is above the threshold percentage, the namespace redirection server may delete or clear the entry from the server cache. Deleting or clearing the entry increases space in the server cache for other information to be cached.

This type of cooperation between the clients and the namespace redirection server allows a good balance to be maintained between the client and server caches in order to facilitate overall performance of the system. For example, the size of the server cache is limited. Entries are maintained in the server cache at the expense of other information that may not be cached because the cache is full.

The cooperation technique allows the namespace redirection server to form an assessment of the number or percentage of clients that have cached an entry about a particular storage unit. If a high number or percentage of clients have cached the entry, the namespace redirection server can delete the entry from its server cache as there is a high likelihood that a client requiring the information will have already cached that information in the client cache.

If, however, a high number or percentage of clients have indicated that they will not be caching the information, the namespace redirection server retains the information in its server cache as there may be a high likelihood of a client contacting the namespace redirection server for the information. In this case, since the namespace redirection server has retained the information in its server cache, the namespace redirection server will not have to retrieve the storage unit location information from the database.

The rolling time period is a configurable value. For example, the rolling time period may be configured to have a duration of 10, 15, 20, 30, or 60 minutes. The duration may be greater than 60 minutes or less than 10 minutes. Likewise, the threshold percentage is also a configurable value. For example, the threshold percentage may be configured as 40, 50, 60, or 70 percent. The threshold percentage may be greater than 70 percent or less than 40 percent.

The space saved in the server cache by deleting entries likely to have been cached at many of the clients allows the namespace redirection server to cache entries about location information for other storage units or other information such as authentication information for the various requests that the namespace redirection server may receive. For example, when the namespace redirection server receives a query, the namespace redirection server is able to authenticate the query using information already locally cached in the server cache at the namespace redirection server rather than having to traverse a network to a remote server.

As an example, consider that there are 1,000 clients, 800 clients have requested location information for a particular storage unit, and 600 of those clients have indicated an intent to cache the location information for the particular storage unit. In this case, over half of the requesting clients have cached the storage unit location information. Thus, there is a high likelihood that should there be another need for the storage unit location information by a client that the client will be able to retrieve the information from its own local client cache. In this case, the namespace redirection server may delete from its server cache its entry for the location information about the particular storage unit.

Alternatively, if, for example, only 10 of those clients have indicated an intent to cache the location information for the particular storage unit there is a high likelihood that should there be another need for the location information by a client that the client will not be able to retrieve the storage unit location information from its own local client cache. Thus, in this case, the namespace redirection server may retain in its server cache its entry for the location information. This allows the storage unit location information to be immediately provided to a requesting client without having to access the database.

There can be many reasons why a client may or may not cache the location information for a storage unit. For example, there are different types of clients or client processes. In some cases, a client or client process corresponds to a container (e.g., Kubernetes container) or other service that is allocated or spawned for only a brief period of time such as to handle a spike in demand. Once the demand drops, the container may be deallocated. In this case, the client may indicate that it does not intend to cache the location information for the storage unit since it is unlikely that the same client will need the information in the future for other data protection operations because of its short lifespan. That is, when there is a need to again perform a backup, a new client or process is spawned. In this case, the client request for storage unit location information to the namespace redirection server may omit a flag indicating that the storage unit location information will be cached.

Alternatively, a client or client process may correspond to a virtual machine or other compute resource that is persistent or has more permanency. In this case, the client may indicate that it does intend to cache the location information for the storage unit since it is likely that the same client will need the information in the future for other data protection operations because of its longer lifespan. In this case, the client request for storage unit location information to the namespace redirection server may include a flag indicating that the storage unit location information will be cached.

In an embodiment, a method includes receiving, at a namespace redirection server, requests from a plurality of clients seeking location information for a storage unit; receiving, in conjunction with the requests, indications that at least a subset of the clients intend to cache the location information for the storage unit; maintaining a count of a number of clients in the subset; and determining whether the location information for the storage unit should be cached at the namespace redirection server based on the count.

FIG. 7 shows another flow for cooperation between the client library and namespace redirection server. In a step 710, a client library tracks failed attempts to connect to a storage appliance on which a storage unit should reside according to storage unit location information cached in a client cache.

In a step 715, based on the failed attempts, the client library queries a namespace redirection server for the storage unit location information and requests that the namespace redirection server perform a force lookup. For example, the client library may issue an RPC to the namespace redirection server and set a parameter or a flag in the RPC indicating that the namespace redirection server should perform a force lookup.

In a step 720, the namespace redirection server upon receiving the request for the force lookup, clears a server referral cache at the namespace redirection server and queries a database for up-to-date storage unit location information. That is, rather than relying on the information cached in the server cache (which the client library has indicated may be stale), the namespace redirection server clears the cache and retrieves the information from the database which has the latest information.

In a step 725, the namespace redirection server receives the up-to-date storage unit location information from the database, caches the information, and returns the up-to-date storage unit location information to the requesting client.

In an embodiment, a method includes maintaining a first client cache at a first client, the first client cache comprising entries tracking storage units and storage appliances on which the storage units should reside; performing a lookup into the first client cache to retrieve location information for a storage unit; attempting to access a storage appliance having the storage unit according to the location information; receiving an error responsive to the attempt indicating that the storage unit sought cannot be found on the storage appliance; and issuing a remote procedure call (RPC) to a namespace redirection server for updated location information for the storage unit and setting a parameter in the RPC requesting that the namespace redirection server perform a force lookup, the force lookup comprising a clearing of a server cache at the server and a retrieval of the updated location information from a database.

In another embodiment, a method includes maintaining a second client cache at a second client, the second client cache comprising entries tracking storage units and storage appliances on which the storage units should reside; performing a lookup into the second client cache to retrieve location information for a storage unit; determining that the second client cache does not have an entry for the location information; and issuing a remote procedure call (RPC) to a namespace redirection server for the location information and not setting a parameter in the RPC requesting that the namespace redirection server perform a force lookup, the namespace redirection server thereby returning the location information to the second client using information cached at a server cache of the namespace redirection server and without communicating with a database for the location information.

In another embodiment, a method includes receiving, at a namespace redirection server, requests from a plurality of clients seeking location information for a storage unit; and receiving, in conjunction with the requests, one or more additional details embedded in the requests, the one or more additional details including a first detail indicating that a server cache at the namespace redirection server should be cleared and the location information for the storage unit retrieved from a database, a second detail indicating whether a client intends to cache the location information returned to the client by the namespace redirection server, and a third detail indicating problems with one or more IP paths used to attempt connections to a storage appliance that should have had the storage unit according to a client cache.

Figure 8:
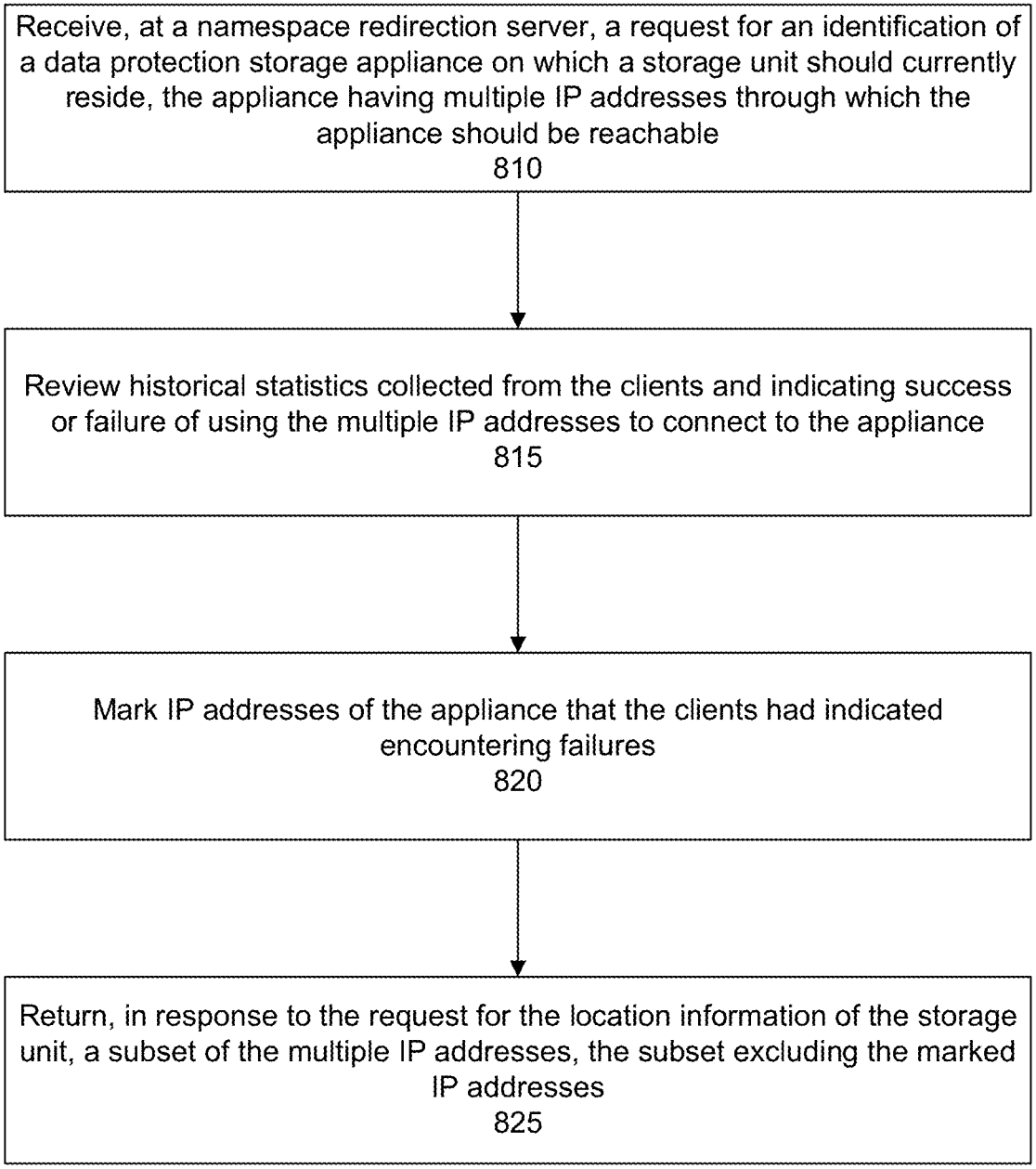
FIG. 8 shows a flow for marking IP addresses of a storage appliance, according to one or more embodiments.

FIG. 8 shows another flow for cooperation between the client library and namespace redirection server. In a step 810, a namespace redirection server receives a request for location information of a storage unit or, more particularly, of an identification of a data protection storage appliance on which a storage unit should currently reside. As discussed, the storage appliance may have multiple IP addresses or locations through which the storage appliance should be reachable.

In a step 815, the namespace redirection server reviews historical statistics collected from the clients. The historical statistics indicate success or failure of using the multiple IP addresses to connect to the storage appliance. In an embodiment, the clients track statistics concerning their success or failure to connect to various storage appliances. Table C below shows an example of statistics that may be collected by the clients.

TABLE C

| Time of attempt | IP Address | Storage Unit Name | Response Time (milliseconds) |
|---|---|---|---|
| Oct. 7, 2022 7:10:33 PM | 172.16.10.30 | SU-1 | 150 |
| Oct. 30, 2022 8:17:22 PM | 172.16.10.31 | SU-1 | timeout |
| ... | ... | ... | |

The field "Time of Attempt" stores a timestamp indicating when an attempt to connect to a storage appliance was made. The field "IP Address" stores a network location to the storage appliance. The field "Response Time" stores the time between a request to the storage appliance and a corresponding response.

The network statistics collected by the clients may be transmitted to the namespace redirection server periodically such as every 5, 10, 15, or 20 minutes or at any other frequency as desired. Periodically sending the statistics to the namespace redirection server assists the namespace redirection server in providing valid IP addresses when responding to other queries from other clients. Instead or additionally, the statistics may accompany queries issued by the clients to the namespace redirection server for storage unit location information. Bundling the statistics into the queries can help to reduce the number of transmissions sent to the namespace redirection server.

In an embodiment, a method includes collecting, by a client library, network statistics concerning attempts to access a plurality of storage units residing on a plurality of storage appliances; after the collecting, receiving, at a client, a request to access a storage unit; looking at a client cache at the client to find a storage appliance having the storage unit; determining that there is a problem accessing the storage unit using information in the client cache; generating a query to be issued to a namespace redirection server for updated storage unit location tracking information; and including, with the query, the network statistics.

In another embodiment, a method includes collecting, by a client library, network statistics concerning attempts to access a plurality of storage units residing on a plurality of storage appliances; and periodically transmitting the network statistics to a namespace redirection server, the transmission being independent of queries to the namespace redirection server for updated storage unit location tracking information. The reply to such a separate RPC could also convey relevant information back to the client. Such information may include updated redirection information, including new IP addresses for moved SU, information on deleted or new SUs, other relevant information, or combinations of these.

In a step 820, the namespace redirection server marks IP addresses from the multiple IP addresses of the storage appliance that the clients had indicated as having encountered failures as being unavailable. For example, failures may be indicated by a connection having timed-out or a response time from a storage appliance having exceeded a threshold time. In some cases, failures might be very local, e.g., due to a failure on the client machine, on the local network the client is connected to, the overall network path from the client to the destination, and so forth. In other words the failure may not necessarily cause any other client to fail when attempting to access the same SU or IP address. In an embodiment, a technique to distinguish failures as being local relies on this information from the clients along with information about additional failures to determine whether or not a particular failure can be classified as a local failure. IP addresses associated with failures classified as local may remain available for other clients to use.

In a step 825, the namespace redirection server returns, in response to the request for the location information, a subset of the IP addresses, the subset excluding the marked IP addresses and including other IP addresses of the storage appliance not marked as unavailable. Excluding the marked or unavailable IP addresses from a listing of IP addresses that a client may use in an attempt to connect to a storage appliance helps to prevent attempting connections to the storage appliance using IP addresses that are likely to be problematic as indicated by other clients.

Figure 9:
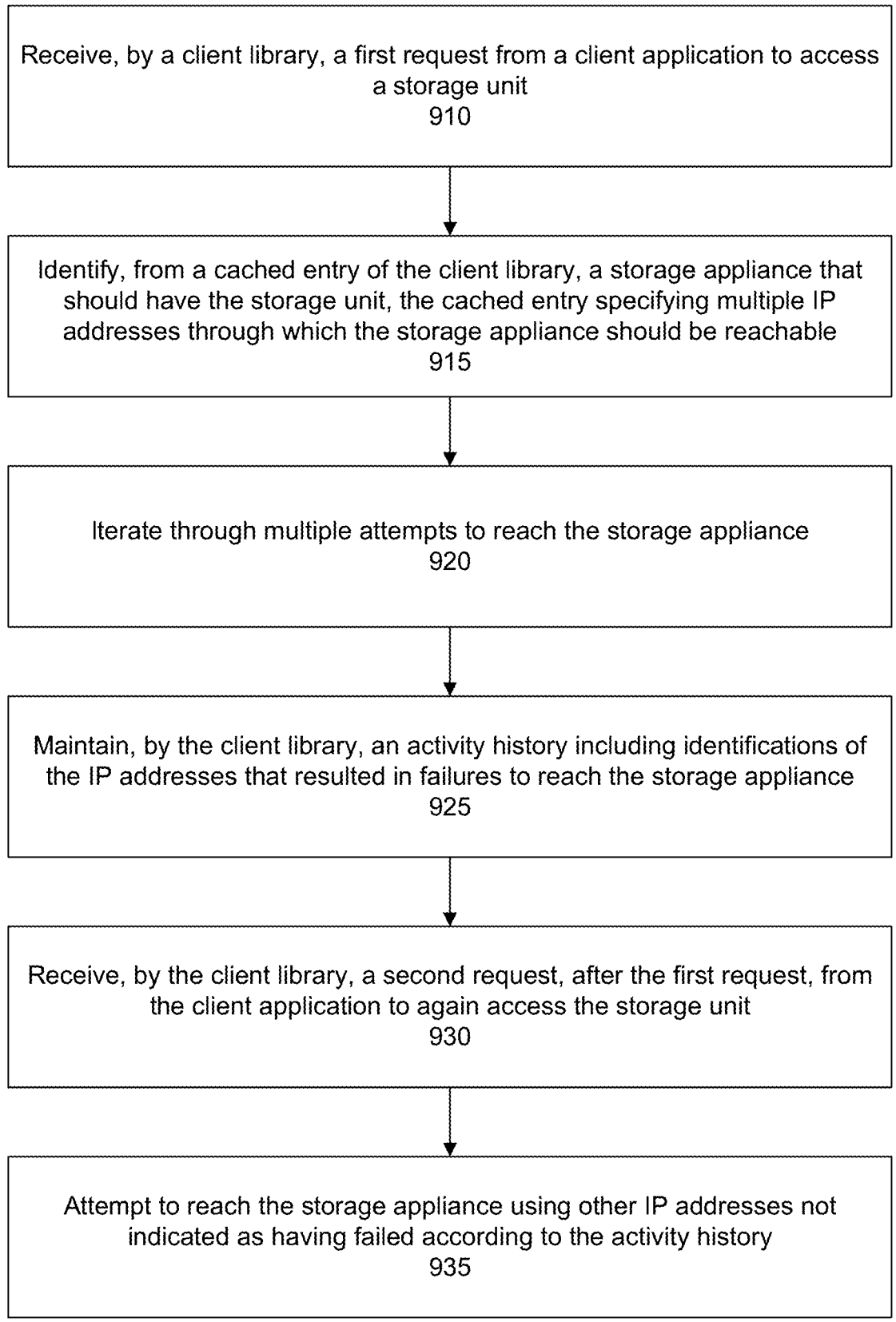
FIG. 9 shows a flow for tracking failures of IP addresses of a storage appliance, according to one or more embodiments.

FIG. 9 shows a flow of an example where a client can maintain error rates associated with past attempts to connect to a storage appliance using the different referral IP addresses, locations, or interfaces that the storage appliance may have. The past error rate can be used to inform subsequent attempts to connect to the storage appliance so that the client does not reattempt connections over IP addresses previously determined to have failed.

In a step 910, a client library receives a first request from a client application to access a storage unit.

In a step 915, the client library identifies, from a cached entry, a storage appliance that should have the storage unit. The cached entry specifies multiple IP addresses through which the storage appliance should be reachable.

In a step 920, the client library iterates through multiple attempts to reach the storage appliance. Each attempt may be made using a different IP address of the multiple IP addresses through which the storage appliance should be reachable. There can be configurable criteria or parameters for determining when a particular IP address should be considered as having failed. For example, the system may be configured such that there is a threshold number attempts to reach a storage appliance using a particular IP address. Once the threshold number of attempts is reached without having successfully connected to the storage appliance, the particular IP address may be marked as failed. For example, after three failed attempts to reach the storage appliance using the particular IP address, the particular IP address may be marked as failed.

As another example, the system may be configured such that there is a threshold time period provided for reaching a storage appliance using a particular IP address. The client library may make any number of repeated attempts during the threshold time period to reach the storage appliance. Upon the threshold time period expiring without having successfully reached the storage appliance using the particular IP address, the particular IP address may be marked as failed.

In a step 925, the client library maintains an activity history of the attempts. The activity history includes identifications of the IP addresses that resulted in failures to reach the storage appliance.

In a step 930, the client library receives a second request, after the first request, from the client application to again access the storage unit.

In a step 935, the client library reviews the activity history and attempts to reach the storage appliance using other IP addresses not indicated as having failed according to the activity history.

Figure 10:
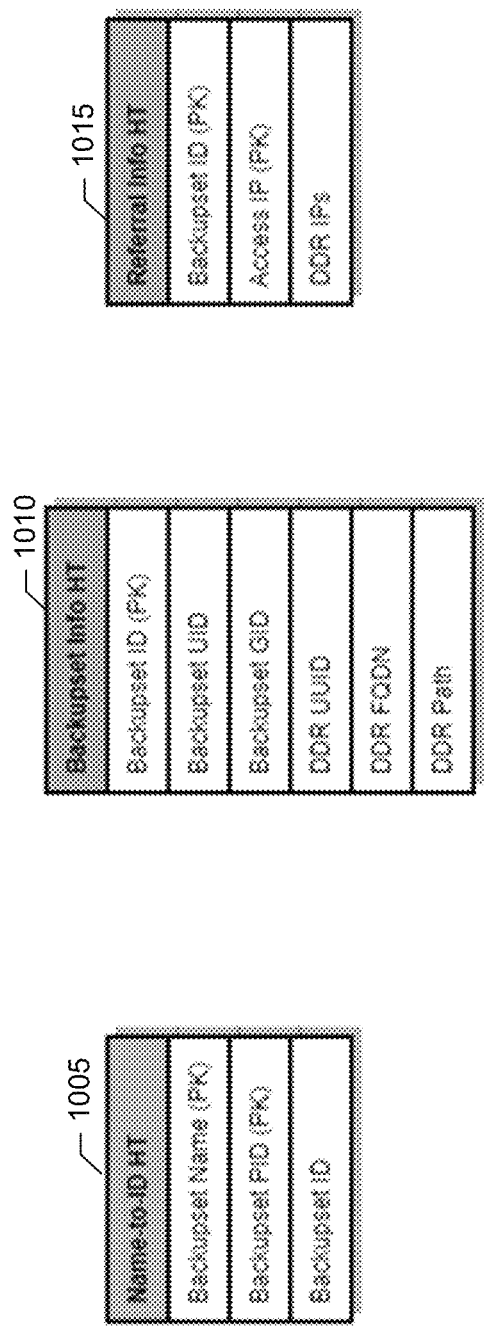
FIG. 10 shows hash tables for a server referral cache, according to one or more embodiments.

FIG. 10 shows a block diagram of information that may be stored in a server cache. In an embodiment, there is a backupset information hash table (HT) 1010 in the namespace redirection server maintained by the pseudo filesystem layer that, as discussed, may be referred to as GSFS. This cache maintains backupset and referral information. Retrieving backupset information from the postgres database is costly from performance point of view and it is not scalable since the underlying database connections are not scalable to serve thousands of client queries. The namespace redirection server referral cache in the GSFS layer provides performance optimization for many client libraries seeking to lookup StorageUnit location information.

The example shown in FIG. 10 includes hash tables 1005, 1010, and 1015. These three separate hash tables form the backupset and referral info cache in GSFS.

In an embodiment, a cache refresh in GSFS may proceed as follows. In a periodic optimized refresh, GSFS first checks if there were any updates to the namespace redirection server database before reading all the entries in cache again from the database. GSFS cache entries are checked for refresh at regular intervals which is configurable via a configuration parameter.

In an embodiment, there is a cooperative cache refresh. The cooperative cache refresh includes taking a callback or a trigger from the postgres database whenever there is an update to a cached or existing entry. This can be achieved by implementing a watch on the database tables and triggering the callbacks to GSFS. This will pro-actively keep the cache updated and helps achieve greater cache performance.

Figure 11:
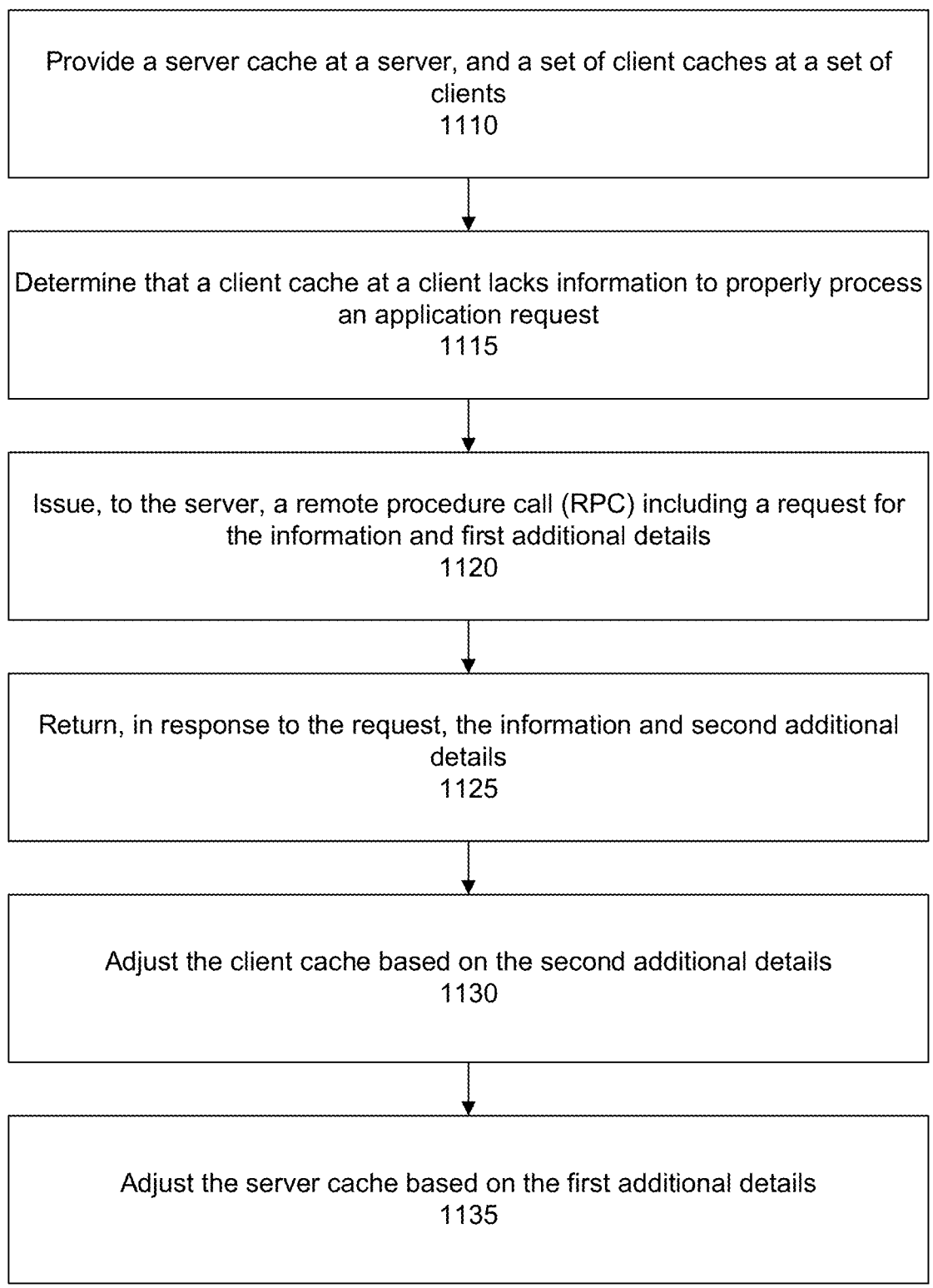
FIG. 11 shows a flow for extending a remote procedure call (RPC) to include additional information to achieve caches that can work in coordination with one another, according to one or more embodiments.

FIG. 11 shows a flow for allowing the sending and receiving of information between a client and server via RPC that is extensible to include additional details to achieve caches that can work in coordination with one another. In this embodiment, the RPC is extended to include additional details or information that can be useful for both sides of the caches. For example, the server can let the client know about a total number of entries present in the database and the client can re-adjust its cache size based on the same to save memory resources.

In a step 1110, a server cache is provided at a server, and a set of client caches are provided at a set of clients.

In a step 1115, a determination is made that a client cache at a client lacks an entry to properly process an application request.

In a step 1120, the client issues a remote procedure call (RPC) to the server that includes a request for the entry and first additional details.

In a step 1125, the server returns, in response to the request, the requested entry and second additional details.

In a step 1130, the client processes the application request using the returned entry and adjusts its client cache based on the second additional details.

In a step 1135, the server adjusts its server cache based on the first additional details.

In an embodiment, each of the first and second details include information that is ancillary to the request for the entry. For example, the first additional details sent by the client to the server is not necessary for the server to respond to the request for the entry. The server is able to respond to the request for the entry even if the first additional details are excluded or omitted from the RPC. Likewise, the second additional details sent by the server to the client is not necessary for the client to process the application request. The client is able to process the application request even if the second additional details are excluded or omitted from the reply by the server to the client.

The first and second additional details, however, include information that allows each side to more efficiently manage their respective caches. For example, the client may include with the first additional details information about past attempts to process the application requests, information about past attempts to process other application requests, number of entries currently present in the client cache, network statistics gathered from processing the application request, network statistics gathered from processing other application requests, information about whether the client intends to cache the returned entry, information about whether the client does not intend to cache the returned entry, requests to clear the server cache, other ancillary information or combinations of these.

The first details can allow the server to efficiently manage its cache and better respond to other requests from other clients. For example, as discussed, the server can maintain a count of clients intending to cache (or not cache) the entries. If a large number of clients intend to cache the entries, the server can delete the entries from its cache so as to increase cache space for other information. If, however, a small number of clients intend to cache the entries, the server can retain the entries in its cache so that the server can quickly respond to other client requests.

The server may include with the second additional details information about the number of entries the server is maintaining, information distilled and collected from other client requests, requests for the client to cache the entry, requests for the client to clear its cache, other ancillary information, or combinations of these.

In an embodiment, there is a method comprising: maintaining, by a database manager, a database comprising information tracking all storage units and all storage appliances on which the storage units currently reside; caching at least a portion of the tracking information in a server cache at a namespace redirection server; caching some of the tracking information in a plurality of client caches at a plurality of clients; receiving, at a client, a request to access a storage unit; looking at a client cache at the client to find a storage appliance having the storage unit; determining that there is a problem accessing the storage unit using the client cache; upon the determination, querying the namespace redirection server for updated tracking information concerning a location of the storage unit; and assisting the namespace redirection server with management of the server cache.

The method may include: making multiple attempts to access the storage unit using the client cache, each attempt resulting in a failure; and setting, in the query to the namespace redirection server, a flag indicating that the namespace redirection server should perform a force lookup for the updated tracking information, the force lookup comprising a clearing of the server cache and communicating with the database manager for the updated tracking information.

The method may include: determining that the problem accessing the storage unit using the client cache is because the client cache does not have an entry for the storage unit; and generating a query for the namespace redirection server, wherein the namespace redirection server upon receipt of the query retrieves the updated tracking information from previously existing information in the server cache and without communicating with the database manager for the updated tracking information.

The method may include: generating a query for the namespace redirection server for the updated tracking information; and setting, in the query, a flag indicating that the client intends to cache the updated tracking information, the setting of the flag thereby allowing the namespace redirection server to maintain a count of a number of clients intending to cache the updated tracking information.

The method may include: generating a query for the namespace redirection server for the updated tracking information; and not setting, in the query, a flag indicating that the client intends to cache the updated tracking information, the not setting of the flag thereby allowing the namespace redirection server to determine whether the updated tracking information should remain cached in the server cache or deleted from the server cache.

The method may include: sending, to the namespace redirection server, identifications of IP addresses of the storage appliance that could not be used to connect to the storage appliance, wherein the namespace redirection server marks the IP addresses as failed and returns, in response to other queries for updated tracking information by other clients, a set of other IP addresses to use to connect to the storage appliance, the set of other IP addresses not including the IP addresses marked as failed.

In another embodiment, there is a system comprising: a processor; and memory configured to store one or more sequences of instructions which, when executed by the processor, cause the processor to carry out the steps of: maintaining, by a database manager, a database comprising information tracking a plurality of storage units and a plurality of storage appliances on which the storage units currently reside; caching at least a portion of the tracking information in a server cache at a namespace redirection server; caching some of the tracking information in a plurality of client caches at a plurality of clients; receiving, at a client, a request to access a storage unit; looking at a client cache at the client to find a storage appliance having the storage unit; determining that there is a problem accessing the storage unit using the client cache; upon the determination, querying the namespace redirection server for updated tracking information concerning a location of the storage unit; and assisting the namespace redirection server with management of the server cache.

In another embodiment, there is a computer program product, comprising a non-transitory computer-readable medium having a computer-readable program code embodied therein, the computer-readable program code adapted to be executed by one or more processors to implement a method comprising: maintaining, by a database manager, a database comprising information tracking a plurality of storage units and a plurality of storage appliances on which the storage units currently reside; caching at least a portion of the tracking information in a server cache at a namespace redirection server; caching some of the tracking information in a plurality of client caches at a plurality of clients; receiving, at a client, a request to access a storage unit; looking at a client cache at the client to find a storage appliance having the storage unit; determining that there is a problem accessing the storage unit using the client cache; upon the determination, querying the namespace redirection server for updated tracking information concerning a location of the storage unit; and assisting the namespace redirection server with management of the server cache.

Figure 12:
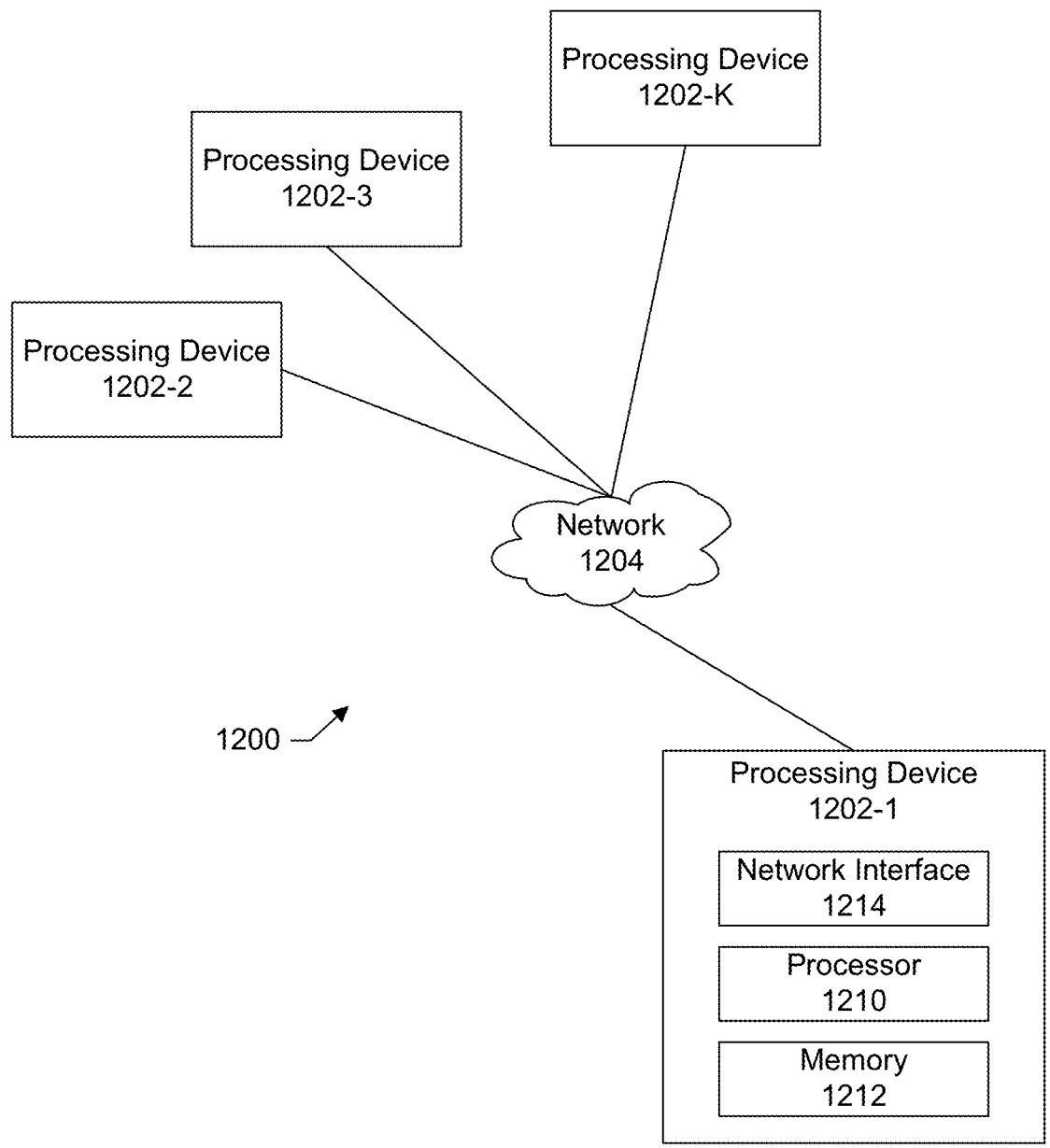
FIG. 12 shows a block diagram of a processing platform that may be utilized to implement at least a portion of an information processing system, according to one or more embodiments.

FIG. 12 shows an example of a processing platform 1200 that may include at least a portion of the information handling system shown in FIG. 1. The example shown in FIG. 12 includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 13:
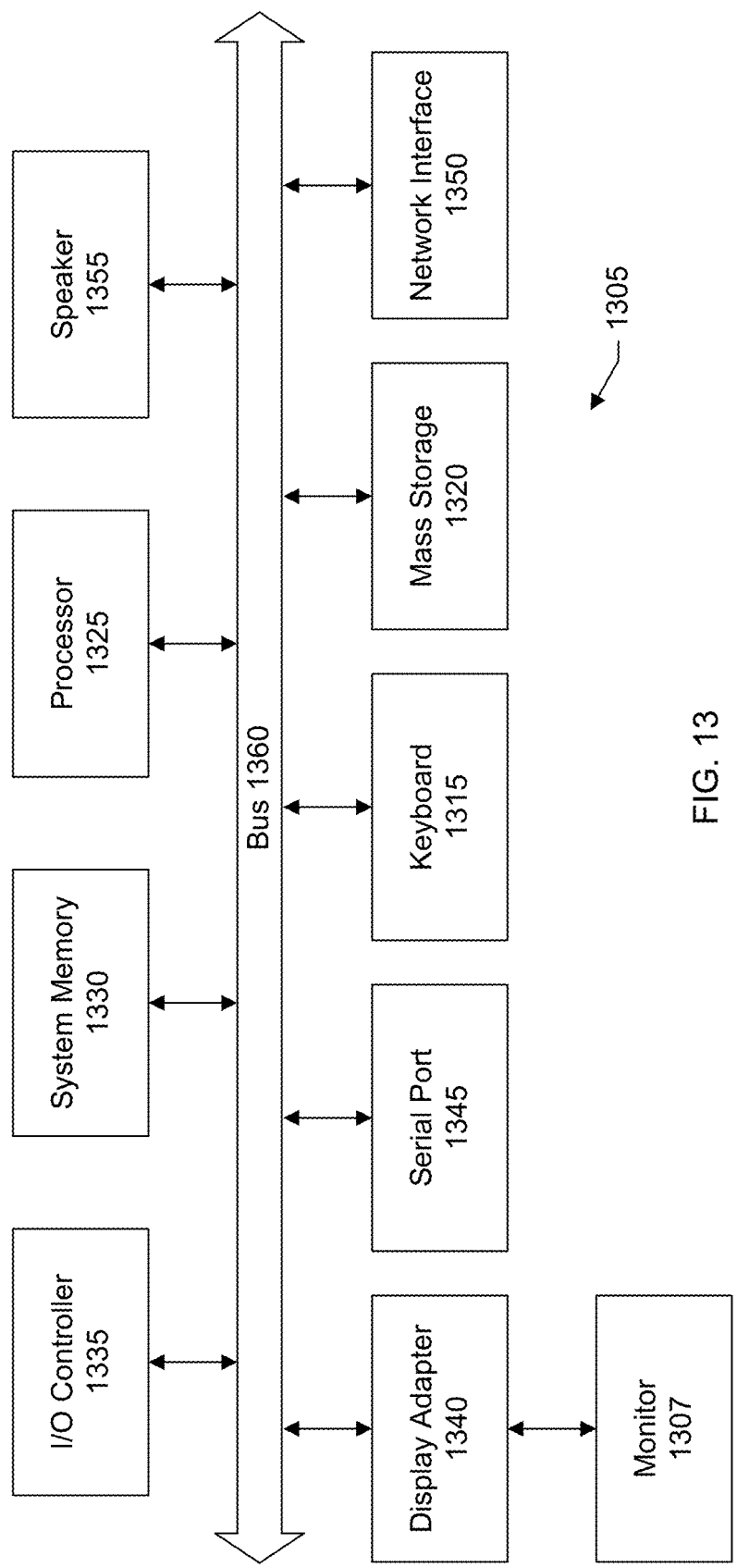
FIG. 13 shows a block diagram of a computer system suitable for use with the system, according to one or more embodiments.

FIG. 13 shows a system block diagram of a computer system 1305 used to execute the software of the present system described herein. The computer system includes a monitor 1307, keyboard 1315, and mass storage devices 1320. Computer system 1305 further includes subsystems such as central processor 1325, system memory 1330, input/output (I/O) controller 1335, display adapter 1340, serial or universal serial bus (USB) port 1345, network interface 1350, and speaker 1355. The system may also be used with computer systems with additional or fewer subsystems. For example, a computer system could include more than one processor 1325 (i.e., a multiprocessor system) or a system may include a cache memory.

Arrows such as 1360 represent the system bus architecture of computer system 1305. However, these arrows are illustrative of any interconnection scheme serving to link the subsystems. For example, speaker 1355 could be connected to the other subsystems through a port or have an internal direct connection to central processor 1325. The processor may include multiple processors or a multicore processor, which may permit parallel processing of information. Computer system 1305 shown in FIG. 13 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodi-

What is claimed is:

1. A method comprising:
maintaining, by a database manager, a database comprising information tracking a plurality of storage units and a plurality of storage appliances on which the storage units currently reside;
caching at least a portion of the tracking information in a server cache at a namespace redirection server;
caching some of the tracking information in a plurality of client caches at a plurality of clients;
receiving, at a client, a request to access a storage unit;
looking at a client cache at the client to find a storage appliance having the storage unit;
determining that there is a problem accessing the storage unit using the client cache;
upon the determination, querying the namespace redirection server for updated tracking information concerning a location of the storage unit;
assisting the namespace redirection server with management of the server cache; and
sending, to the namespace redirection server, identifications of IP addresses of the storage appliance that could not be used to connect to the storage appliance,
wherein the namespace redirection server marks the IP addresses as failed and returns, in response to other queries for updated tracking information by other clients, a set of other IP addresses to use to connect to the storage appliance, the set of other IP addresses not including the IP addresses marked as failed.

2. The method of claim 1 further comprising:
making multiple attempts to access the storage unit using the client cache, each attempt resulting in a failure; and
setting, in the query to the namespace redirection server, a flag indicating that the namespace redirection server should perform a force lookup for the updated tracking information, the force lookup comprising a clearing of the server cache and communicating with the database manager for the updated tracking information.

3. The method of claim 1 further comprising:
determining that the problem accessing the storage unit using the client cache is because the client cache does not have an entry for the storage unit; and
generating a query for the namespace redirection server, wherein the namespace redirection server upon receipt of the query retrieves the updated tracking information from previously existing information in the server cache and without communicating with the database manager for the updated tracking information.

4. The method of claim 1 further comprising:
generating a query for the namespace redirection server for the updated tracking information; and
setting, in the query, a flag indicating that the client intends to cache the updated tracking information,
the setting of the flag thereby allowing the namespace redirection server to maintain a count of a number of clients intending to cache the updated tracking information.

5. The method of claim 1 further comprising:
generating a query for the namespace redirection server for the updated tracking information; and
not setting, in the query, a flag indicating that the client intends to cache the updated tracking information,
the not setting of the flag thereby allowing the namespace redirection server to determine whether the updated tracking information should remain cached in the server cache or deleted from the server cache.

6. A system comprising: a processor; and memory configured to store one or more sequences of instructions which, when executed by the processor, cause the processor to carry out the steps of:
maintaining, by a database manager, a database comprising information tracking a plurality of storage units and a plurality of storage appliances on which the storage units currently reside;
caching at least a portion of the tracking information in a server cache at a namespace redirection server;
caching some of the tracking information in a plurality of client caches at a plurality of clients;
receiving, at a client, a request to access a storage unit;
looking at a client cache at the client to find a storage appliance having the storage unit;
determining that there is a problem accessing the storage unit using the client cache;
upon the determination, querying the namespace redirection server for updated tracking information concerning a location of the storage unit;
assisting the namespace redirection server with management of the server cache; and
sending, to the namespace redirection server, identifications of IP addresses of the storage appliance that could not be used to connect to the storage appliance,
wherein the namespace redirection server marks the IP addresses as failed and returns, in response to other queries for updated tracking information by other clients, a set of other IP addresses to use to connect to the storage appliance, the set of other IP addresses not including the IP addresses marked as failed.

7. The system of claim 6 wherein the processor further carries out the steps of:
making multiple attempts to access the storage unit using the client cache, each attempt resulting in a failure; and
setting, in the query to the namespace redirection server, a flag indicating that the namespace redirection server should perform a force lookup for the updated tracking information, the force lookup comprising a clearing of the server cache and communicating with the database manager for the updated tracking information.

8. The system of claim 6 wherein the processor further carries out the steps of:
determining that the problem accessing the storage unit using the client cache is because the client cache does not have an entry for the storage unit; and
generating a query for the namespace redirection server, wherein the namespace redirection server upon receipt of the query retrieves the updated tracking information from previously existing information in the server cache and without communicating with the database manager for the updated tracking information.

9. The system of claim 6 wherein the processor further carries out the steps of:
generating a query for the namespace redirection server for the updated tracking information; and
setting, in the query, a flag indicating that the client intends to cache the updated tracking information,
the setting of the flag thereby allowing the namespace redirection server to maintain a count of a number of clients intending to cache the updated tracking information.

10. The system of claim 6 wherein the processor further carries out the steps of:

generating a query for the namespace redirection server for the updated tracking information; and not setting, in the query, a flag indicating that the client intends to cache the updated tracking information, the not setting of the flag thereby allowing the namespace redirection server to determine whether the updated tracking information should remain cached in the server cache or deleted from the server cache.

11. A computer program product, comprising a non-transitory computer-readable medium having a computer-readable program code embodied therein, the computer-readable program code adapted to be executed by one or more processors to implement a method comprising:

maintaining, by a database manager, a database comprising information tracking a plurality of storage units and a plurality of storage appliances on which the storage units currently reside;

caching at least a portion of the tracking information in a server cache at a namespace redirection server;

caching some of the tracking information in a plurality of client caches at a plurality of clients;

receiving, at a client, a request to access a storage unit;

looking at a client cache at the client to find a storage appliance having the storage unit;

determining that there is a problem accessing the storage unit using the client cache;

upon the determination, querying the namespace redirection server for updated tracking information concerning a location of the storage unit;

assisting the namespace redirection server with management of the server cache; and sending, to the namespace redirection server, identifications of IP addresses of the storage appliance that could not be used to connect to the storage appliance, wherein the namespace redirection server marks the IP addresses as failed and returns, in response to other queries for updated tracking information by other clients, a set of other IP addresses to use to connect to the storage appliance, the set of other IP addresses not including the IP addresses marked as failed.

12. The computer program product of claim 11 wherein the method further comprises:

making multiple attempts to access the storage unit using the client cache, each attempt resulting in a failure; and setting, in the query to the namespace redirection server, a flag indicating that the namespace redirection server should perform a force lookup for the updated tracking information, the force lookup comprising a clearing of the server cache and communicating with the database manager for the updated tracking information.

13. The computer program product of claim 11 wherein the method further comprises:

determining that the problem accessing the storage unit using the client cache is because the client cache does not have an entry for the storage unit; and generating a query for the namespace redirection server, wherein the namespace redirection server upon receipt of the query retrieves the updated tracking information from previously existing information in the server cache and without communicating with the database manager for the updated tracking information.

14. The computer program product of claim 11 wherein the method further comprises:

generating a query for the namespace redirection server for the updated tracking information; and setting, in the query, a flag indicating that the client intends to cache the updated tracking information, the setting of the flag thereby allowing the namespace redirection server to maintain a count of a number of clients intending to cache the updated tracking information.

15. The computer program product of claim 11 wherein the method further comprises:

generating a query for the namespace redirection server for the updated tracking information; and not setting, in the query, a flag indicating that the client intends to cache the updated tracking information, the not setting of the flag thereby allowing the namespace redirection server to determine whether the updated tracking information should remain cached in the server cache or deleted from the server cache.

\* \* \* \* \*